Jan. 29, 1963 J. W. TOSKI ETAL 3,076,128
CONSTANT CURRENT SUPPLY APPARATUS
Filed Jan. 30, 1961
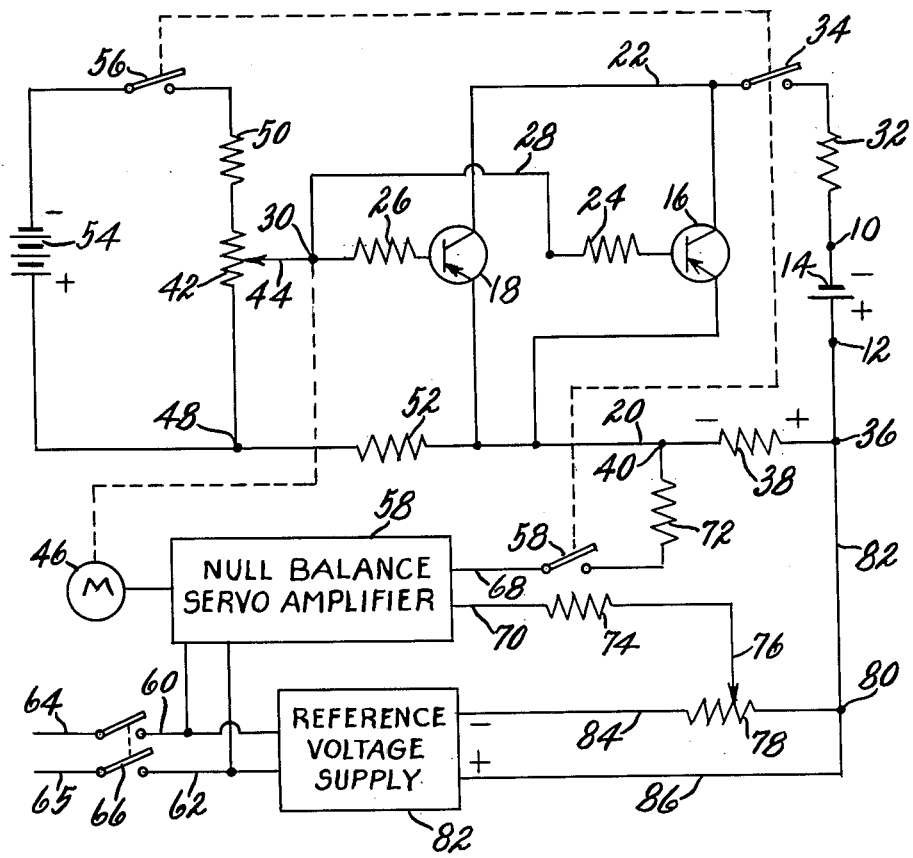
INVENTORS
JOHN W. TOSKI
ROBERT F. SPAIN
BY C. R. Meland
THEIR ATTORNEY

United States Patent Office 3,076,128
Patented Jan. 29, 1963

3,076,128
CONSTANT CURRENT SUPPLY APPARATUS
John W. Toski, Rochester, and Robert F. Spain, Troy, Mich., assignors to General Motors Corporation, Detroit, Mich., a corporation of Delaware
Filed Jan. 30, 1961, Ser. No. 85,707
3 Claims. (Cl. 320—39)

This invention relates to an electrical system for providing a constant current supply from a direct current power supply such as from a storage battery.

In present day applications of electrical equipment, it is often desirable to have a current supply from a source of direct voltage that remains constant even though the voltage of the source may change. One example of this is in the testing of storage batteries where it is desirable to maintain a constant current output from the battery for a given length of time as a part of a test procedure for the battery.

It accordingly is an object of this invention to provide an electrical system that is operative to maintain the current output of a D.C. power source at a constant level.

A further object of this invention is to provide an electrical system that maintains a constant current output from a power source and which includes one or more semiconductors such as transistors for applying a load to the power source which varies in accordance with the current output of the source.

Still another object of this invention is to provide an electrical system that maintains a constant current output from a power source and which includes one or more semiconductors such as transistors for applying a variable load to the power source, the transistors being biased from a separate power source and the system including means for varying this bias in accordance with current output of the power source.

Another object of this invention is to provide an electrical system that is operative to maintain a constant current output from a storage battery and wherein means are provided for selecting a plurality of constant current outputs.

Further objects and advantages of the present invention will be apparent from the following description, reference being had to the accompanying drawing wherein preferred embodiments of the present invention are clearly shown.

In the drawings:

The single FIGURE drawing is a schematic electrical circuit diagram of a constant current supply system made in accordance with this invention.

Referring now to the drawing, the reference numerals 10 and 12 designate terminals to which is connected a source of direct current power. In the present instance, the terminals 10 and 12 are connected to a battery 14 which is to be tested. The test procedure for this battery is to maintain a constant current output from the battery for a given length of time and the circuit to be described accomplishes this result.

The circuit for maintaining a constant current output from the battery 14 includes transistors 16 and 18 which are of the PNP type. The emitter electrodes of transistors 16 and 18 are connected with a lead wire 20 whereas the collector electrodes of these two transistors are connected with the lead wire 22. The base electrodes of transistors 16 and 18 are connected respectively with resistors 24 and 26 and it is seen that these resistors are connected together by a lead wire 28. The base electrodes of transistors 16 and 18 are thus both connected with the junction 30 through the resistors 24 and 26 which preferably have equal resistance values in the neighborhood of one ohm.

The terminal 10 which is connected to one side of the battery 14 is connected to one side of a load which is designated by reference numeral 32. This load has resistance and also may have inductance where the load for example is the coil winding of an ammeter. Where this system is being used to test the battery, the load 32 will be an ammeter but it will be apparent from a further description of this system that the load 32 could be any other electrical load that is desired to be supplied with a constant current. It is seen that the opposite side of the load 32 is connected with manually operable switch 34.

The terminal 12 is connected with a junction 36 and it is seen that a resistor 38 is connected between junctions 36 and 40 and is also connected in series with the lead wire 20. It can be seen that the battery 14 will discharge through a path that may be traced from terminal 12, through resistor 38, through lead wire 20, through the emitter to collector circuit of transistors 16 and 18, through switch 34, through load 32 and thence to the terminal 10. It will be appreciated that the amount of current flowing in this circuit will depend upon the conductivity of the transistors 16 and 18 which are connected in parallel.

The conductivity of transistors 16 and 18 depends upon the voltage appearing between the emitter and base electrodes of these transistors. This voltage is controlled by a biasing circuit that includes the potentiometer resistor 42 having a shiftable slider or tap 44. The potentiometer may be of any well-known type and may include a rotatable shaft for changing its resistance. The potentiometer resistor 42 may have a maximum resistance of 50 ohms and the movable tap 44 is adjusted by an electric motor 46. It is seen that the potentiometer 42 is connected with junction 48 and with a resistor 50 that may be for example a 25 ohm resistor. The junction 48 is connected to a resistor 52 and is also connected to one side of a control supply battery 54 which may be for example a 12 volt battery. The battery 54 has its opposite side connected with manually operable switch 56 which is preferably ganged to the switch 34 and another switch 58.

It can be seen that when the switch 56 is closed, a certain potential will appear across the potentiometer resistor 42 and that the shifting of tap 44 will vary the potential applied between the emitter and base electrodes of transistors 16 and 18. It thus is seen that the conductivity of transistors 16 and 18 between their emitter and collector electrodes can be controlled by a shifting of the tap 44. This, of course, controls the current flow from the battery 14 and the current flow through the load 32.

The electric motor 46 which drives the slider or tap 44 is controlled by a conventional null balance servo amplifier 58 which drives the slider in accordance with error voltages which it receives. This servo amplifier is supplied with 110 volt A.C. from lead wires 60 and 62 which are connected with supply lines 64 and 65 through the switch 66. The supply lines 64 and 65 are connected to any suitable 110 volt 60 cycle outlet.

The servo amplifier 58 is connected with lead wires 68 and 70 which receive a signal from a network to control the operation of the motor 46. The lead wire 68 is connected with switch 58 and it is seen that the opposite side of this switch is connected with a resistor 72. The lead wire 70 is connected with a resistor 74 and this resistor is connected to the slider or tap 76 on a potentiometer resistor 78. The potentiometer resistor 78 has one side thereof connected with junction 80 and this junction is connected with junction 36 via the lead wire 82.

The opposite side of potentiometer resistor 78 is connected with a conventional reference voltage supply 82 by the lead wire 84. The reference voltage supply is supplied with A.C. power from the leads 60 and 62 and delivers a constant D.C. output voltage which may be used as a reference voltage. This reference voltage supply may have a constant output of 1.5 volts with an input of 110 volts A.C. The reference voltage supply is connected with lead wire 86 and this 1.5 volts appears across the lead wires 84 and 86. Since this is true, it is apparent that the 1.5 volts will also appear across resistor 78 and a part of this voltage may be picked off by the slider 76.

In the operation of this system, the potentiometer 78 is set to give a required constant current output from the battery 14. The switch 66 is closed and after a short warm up period, the switches 34, 56, and 58 which are ganged together are closed. If desired, the current control potentiometer resistor 78 may be initially set to zero.

When the switches have been closed as described, the battery 12 will supply current through a circuit that includes the transistors 16 and 18 and this current will depend upon the conductivity of transistors 16 and 18. The current that flows through transistors 16 and 18 will develop a voltage across resistor 38 which has the polarity as indicated. This voltage is compared with the voltage developed between the tap 76 and junction 80 and any difference or error voltge between these two voltages is supplied to the servo amplifier 58. The servo amplifier then causes the motor 46 to operate to adjust the tap 44 and bring the system into a balanced condition where the voltage across resistor 38 equals the voltage between tap 76 and junction 80. As an example of this, if the current control potentiometer 78 is set for two amperes and the transistors 16 and 18 permit the conduction of three amperes, the voltage developed across resistor 38 will cause an error voltage to be developed and applied to the servo amplifier 58. This will cause the motor 46 to be driven in such a direction as to shift the slider 44 in a direction to reduce the voltage applied between the emitter and base of transistors 16 and 18 and thus reduce the conductivity to a point where they only conduct two amperes.

From the foregoing, it can be seen that the electrical system of this invention will maintain a constant current through the load 32 even though the potential of battery 14 may drop as time progresses. It has been found that this system can maintain constant discharge rates of 1 to 10 amperes from a battery voltage of 2.2 to less than 1 volt. At discharge rates of less than 5 amperes constant current is maintained to less than .5 volt.

While the embodiments of the present invention as herein disclosed constitute a preferred form, it is to be understood that other forms might be adopted.

What is claimed is as follows:

1. An electrical system for maintaining a constant output current from a source of direct current voltage comprising, a transistor having emitter, base and collector electrodes, a source of biasing potential, a potentiometer having shiftable means connected with said source of biasing potential, an electric motor for shifting said shiftable means, means connecting the emitter and base electrodes of said transistor with said potentiometer, means connecting the emitter to collector circuit of said transistor in series with said source of direct current voltage, a circuit element having resistance connected in series with said transistor and direct current voltage source for developing a voltage that is proportional to the current output of said voltage source, means for developing a reference voltage, a servo amplifier for controlling the operation of said motor, and means for applying a signal voltage to said servo amplifier that depends upon the difference in voltage of said reference voltage and the voltage developed across said circuit element.

2. An electrical system for maintaining a constant current output from a storage battery comprising, a transistor having emitter, base and collector electrodes, means connecting the emitter to collector circuit of said transistor in series with said battery, a resistor connected in series with said transistor and battery for developing a voltage that is proportional to the current flowing in the series circuit, means providing a source of reference voltage, a potentiometer having shiftable means connected with said source of reference voltage, means providing an output voltage that is equal to the difference in the voltage developed by said potentiometer and said resistor, and means for controlling the conductivity of said transistor between its emitter and collector in accordance with said difference voltage.

3. An electrical circuit for maintaining a constant current output from a source of D.C. voltage comprising, a transistor having emitter, base and collector electrodes, means connecting the emitter to collector circuit of said transistor in series with said D.C. voltage source, a source of bias voltage separate from said D.C. voltage source, a potentiometer resistor having opposite ends connected with said source of biasing voltage and having shiftable tap means, means connecting said emitter and base electrodes of said transistor between said tap means and another part of said potentiometer resistor, and means for causing a shiftable movement of said tap means in accordance with current flow in the series circuit between said D.C. voltage source and transistor.

References Cited in the file of this patent
UNITED STATES PATENTS 2,983,831    Walton _____ May 9, 1961